(12) United States Patent
Park

(10) Patent No.: US 10,778,950 B2
(45) Date of Patent: Sep. 15, 2020

(54) IMAGE STITCHING METHOD USING VIEWPOINT TRANSFORMATION AND SYSTEM THEREFOR

(71) Applicant: CENTER FOR INTEGRATED SMART SENSORS FOUNDATION, Daejeon (KR)

(72) Inventor: Ki Yeong Park, Daejeon (KR)

(73) Assignee: CENTER FOR INTEGRATED SMART SENSORS FOUNDATION, Daejeon (KR)

(*) Notice: Subject to any disclaimer, the term of this patent is extended or adjusted under 35 U.S.C. 154(b) by 0 days.

(21) Appl. No.: 16/201,385

(22) Filed: Nov. 27, 2018

(65) Prior Publication Data

US 2019/0166349 A1 May 30, 2019

(30) Foreign Application Priority Data

Nov. 28, 2017 (KR) ........................ 10-2017-0160021

(51) Int. Cl.

| | | |
|---|---|---|
| *H04N 13/111* | (2018.01) | |
| *G06T 3/40* | (2006.01) | |
| *H04N 13/128* | (2018.01) | |
| *H04N 5/232* | (2006.01) | |
| *H04N 13/271* | (2018.01) | |
| *H04N 13/239* | (2018.01) | |
| *G06T 3/00* | (2006.01) | |

(52) U.S. Cl.
CPC .......... *H04N 13/111* (2018.05); *G06T 3/0068* (2013.01); *G06T 3/4038* (2013.01); *H04N 5/232* (2013.01); *H04N 5/23238* (2013.01); *H04N 13/128* (2018.05); *H04N 13/239* (2018.05); *H04N 13/271* (2018.05)

(58) Field of Classification Search
CPC .... H04N 13/111; H04N 13/239; H04N 5/232; H04N 13/271; H04N 5/23238; H04N 13/128; G06T 3/4038; G06T 3/0068
See application file for complete search history.

(56) References Cited

U.S. PATENT DOCUMENTS

| | | | |
|---|---|---|---|
| 9,183,669 B2* | 11/2015 | Liu | G06T 15/20 |
| 9,369,695 B2* | 6/2016 | Masuda | G01C 3/06 |
| 9,607,406 B2* | 3/2017 | Hata | G01B 11/02 |
| 9,749,614 B2* | 8/2017 | Chen | H04N 5/23212 |

(Continued)

FOREIGN PATENT DOCUMENTS

| | | |
|---|---|---|
| JP | 2004287517 | 10/2004 |
| KR | 100490885 | 5/2005 |
| KR | 20120093751 | 8/2012 |

OTHER PUBLICATIONS

Schmeing, Michael; Jiang, Xiaoyi; Wang, Patrick S. P.; "Depth Image Based Rendering" Chapter 12 of Pattern Recognition, Machine Intelligence and Biometrics, 2011; Springer Berlin Heidelberg; pp. 279-310 (Year: 2011).*

*Primary Examiner* — Jeremiah C Hallenbeck-Huber
(74) *Attorney, Agent, or Firm* — Cozen O'Connor

(57) ABSTRACT

An image stitching method using viewpoint transformation and a system therefor are provided. The method includes obtaining images captured by a plurality of cameras included in the camera system, performing viewpoint transformation for each of the images using a depth map for the images, and stitching the images, the viewpoint transformation of which is performed.

7 Claims, 10 Drawing Sheets

(56) References Cited

U.S. PATENT DOCUMENTS

| | | | |
|---|---|---|---|
| 10,349,058 B2 * | 7/2019 | Jin ..................... | H04N 13/271 |
| 2014/0313290 A1 * | 10/2014 | Tech ................... | H04N 13/111 |
| | | | 348/43 |
| 2017/0308990 A1 * | 10/2017 | Middleton ............. | G06T 15/20 |
| 2019/0124361 A1 * | 4/2019 | Zhao ................... | H04N 13/128 |

* cited by examiner

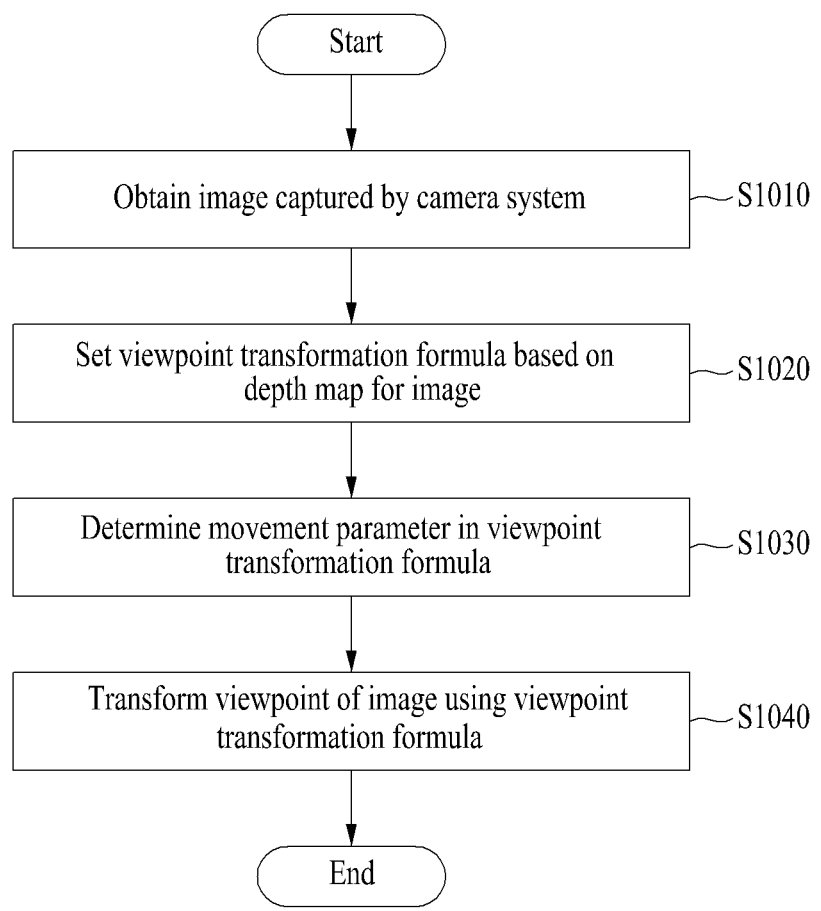

IMAGE STITCHING METHOD USING VIEWPOINT TRANSFORMATION AND SYSTEM THEREFOR

CROSS-REFERENCE TO RELATED APPLICATIONS

This application claims priority under 35 U.S.C. § 119 to Korean Patent Application No. 10-2017-0160021 filed on Nov. 28, 2017, in the Korean Intellectual Property Office, the disclosures of which are incorporated by reference herein in their entireties.

BACKGROUND

Embodiments of the inventive concept described herein relate to an image stitching system and a method therefor, and more particularly, relate to technologies of stitching images using viewpoint transformation and technologies of transforming viewpoints of the images.

To stitch several images into one image to produce a panorama image is performed through a procedure of aligning images including the same subject (images, each of which has an overlapped portion), determining relative motion between the images, projecting the images onto a cylinder or sphere, and blending portions where the images are overlaid with each other, and has been studied for a long time in the computer vision field.

In detail, a manner of aligning images may include a manner to compare the images for each patch and obtaining optical flow and a manner of extracting feature points from an image and comparing the feature points. Particularly, the feature-based manner shows a more robust result with respect motion of a scene and has a faster processing speed. Furthermore, an adjacent relationship may be automatically identified from blended images to produce a panorama. Such a manner is disclosed in the paper, Brown, M. and Lowe, D., "Recognizing panoramas", ICCV 2003, pp. 1218-1225, Nice Prance.

Furthermore, when registering and aligning images and determining motion, models such as two-dimensional (2D) transform, a planar perspective model, or three-dimensional (3D) camera rotation are used. Images may be overlaid and shown (i.e., the "ghost" may occur) due to parallax or motion of a subject in a joint or there may be a brightness difference between the images when stitching the images, so a manner of accurately blending two images, a joint with small texture of which is stitched or joined.

As such, stitching the images results in a ghost phenomenon where an image joint is blurry or overlapped, when there is parallax between the images. For example, in case of a 360-degree camera system configured with a plurality of cameras which are currently released and is widely used, there is parallax between images captured by the plurality of cameras and a seam is not matched in a joint of the images when the images are stitched. However, to capture images such that there is no parallax between the images, the images should be captured while a camera rotates physically with respect to an optical center of the camera. Since the optical center is located inside or in front of a camera lens system, when a camera system including two or more cameras captures images, there is always parallax since it is impossible to match optical centers of the cameras.

To match optical centers between images captured by several cameras, a manner of using a separate optical device such as a mirror is proposed. However, the manner has a disadvantage in which a viewing angle is limited and a disadvantage in which the bulk of a camera is increased. Such a manner is disclosed in the paper, Kar-Han Tan, Hong Hua, and Narendra Ahuja, "Multiview Panoramic Cameras Using Mirror Pyramids", IEEE Trans. Pattern Analysis and Machine Intelligence 26:7 (2004), 941-945.

Moreover, a manner to partially modify each of images captured by several cameras is proposed. However, the manner is to minimize a mismatch in seam rather than to remove parallax and has a problem in which a partial distortion occurs in images.

Technologies of matching viewpoints of images to remove parallax which exists between the images, without a separate device while a camera does not rotate or move physically and technologies of synthesizing and stitching images, each of which has parallax, based on the corresponding technologies are proposed.

SUMMARY

Embodiments of the inventive concept provide an image stitching method for transforming a viewpoint of each of images as if the images are captured at the same location and stitching the images without a separate device while a camera does not rotate or move physically, a system therefor, and a computer program stored in a computer-readable storage medium to be combined with a computer and execute the image stitching method.

Embodiments of the inventive concept provide an image stitching method for matching optical centers which are viewpoints of images to remove parallax between the images and stitching the images by performing viewpoint transformation for each of the images using a viewpoint transformation formula based on a depth map for the images, a system therefor, and a computer program.

Embodiments of the inventive concept provide an image stitching method for enhancing completion of a stitched image by filling a hole in images, viewpoint transformation of which is performed, and the stitched image, a system therefor, and a computer program.

Embodiments of the inventive concept provide an image viewpoint transformation method for transforming a viewpoint of an image using a viewpoint transformation formula based on a depth map for the image, a system therefor, and a computer program stored in a computer-readable storage medium to be combined with a computer and execute the image viewpoint transformation.

According to an exemplary embodiment, an image stitching method using viewpoint transformation executed by a computer included in a camera system may include obtaining images captured by a plurality of cameras included in the camera system, performing viewpoint transformation for each of the images using a depth map for the images, and stitching the images, the viewpoint transformation of which is performed.

The performing of the viewpoint transformation for each of the images may include setting a viewpoint transformation formula based on a focal length of each of the plurality of cameras, a length of a baseline of the camera system, and parallax between the plurality of cameras, based on the depth map, determining a movement parameter in the viewpoint transformation formula, the movement parameter being a value associated with a distance to move when a location where each of the images is captured moves to a virtual specific location, and transforming viewpoints of the images using the viewpoint transformation formula to be matched.

The determining of the movement parameter in the viewpoint transformation formula may include determining the movement parameter based on a distance to move when an optical center of each of the plurality of cameras moves to a virtual reference location of the camera system.

The determining of the movement parameter in the viewpoint transformation formula may include determining the movement parameter based on the length of the baseline of the camera system.

The transforming of the images of the images to be matched may include transforming the viewpoint of each of the images into a viewpoint of an image captured at a reference location of the camera system.

The performing of the viewpoint transformation for each of the images may further include filling a hole of the depth map before performing the viewpoint transformation for each of the images.

The performing of the viewpoint transformation for each of the images may further include filling a hole of each of the images, the viewpoint transformation of which is performed.

The stitching of the images, the viewpoint transformation of which is performed, may further include transforming a viewpoint of the stitched image to fill a hole of the stitched image.

According to an exemplary embodiment, a computer program stored in a computer-readable storage medium may be combined with a computer and may execute an image stitching method using viewpoint transformation, the method including obtaining images captured by a plurality of cameras included in a camera system, performing viewpoint transformation for each of the images using a depth map for the images, and stitching the images, the viewpoint transformation of which is performed.

According to an exemplary embodiment, an image stitching system using viewpoint transformation, implemented with a computer included in a camera system, may include at least one processor configured to execute computer-readable instructions. The at least one processor may include an image obtaining unit configured to obtain images captured by a plurality of cameras included in the camera system, a viewpoint transformation performing unit configured to perform viewpoint transformation for each of the images using a depth map for the images, and a stitching unit configured to stitch the images, the viewpoint transformation of which is performed.

According to an exemplary embodiment, an image viewpoint transformation method executed by a computer included in a camera system may include obtaining an image captured by the camera system, setting a viewpoint transformation formula based on a focal length of the camera system, a length of a baseline of the camera system, and parallax of the camera system, based on a depth map for the image, determining a movement parameter in the viewpoint transformation formula, the movement parameter being a value associated with a distance to move when a location where the image is captured moves to a virtual specific location, and transforming a viewpoint of the image using the viewpoint transformation formula.

The determining of the movement parameter in the viewpoint transformation formula may include determining the movement parameter based on a distance to move when an optical center of the camera system moves to the virtual specific location.

According to an exemplary embodiment, a computer program stored in a computer-readable storage medium may be combined with a computer and may execute an image viewpoint transformation method including obtaining an image captured by a camera system, setting a viewpoint transformation formula based on a focal length of the camera system, a length of a baseline of the camera system, and parallax of the camera system, based on a depth map for the image, determining a movement parameter in the viewpoint transformation formula, the movement parameter being a value associated with a distance to move when a location where the image is captured moves to a virtual specific location, and transforming a viewpoint of the image using the viewpoint transformation formula.

According to an exemplary embodiment, an image viewpoint transformation system implemented with a computer included in a camera system may include at least one processor configured to execute computer-readable instructions. The at least one processor may include an image obtaining unit configured to obtain an image captured by a camera system, a formula setting unit configured to set a viewpoint transformation formula based on a focal length of the camera system, a length of a baseline of the camera system, and parallax of the camera system, based on a depth map for the image, a movement parameter determining unit configured to determine a movement parameter in the viewpoint transformation formula, the movement parameter being a value associated with a distance to move when a location where the image is captured moves to a virtual specific location, and a viewpoint transformation unit configured to transform a viewpoint of the image using the viewpoint transformation formula.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 10 is a flowchart illustrating an image viewpoint transformation system according to an embodiment.

DETAILED DESCRIPTION

Hereinafter, a description will be given in detail of embodiments of the inventive concept with reference to the accompanying drawings.

Figure 1:
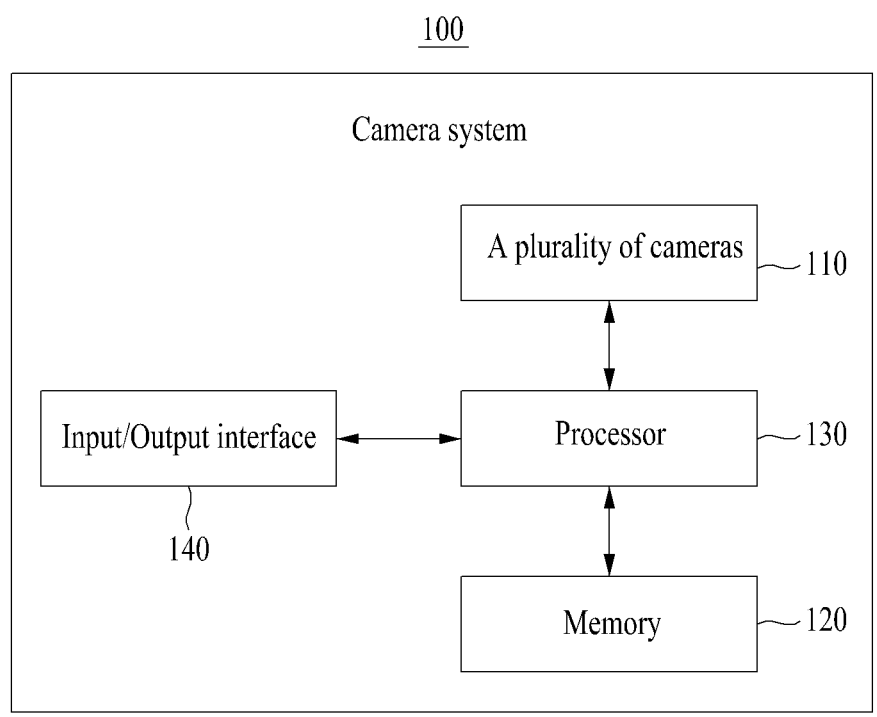
FIG. 1 is a block diagram illustrating a configuration of a camera system according to an embodiment.

FIG. 1 is a block diagram illustrating a configuration of a camera system according to an embodiment.

Referring to FIG. 1, a camera system 100 according to an embodiment may include a plurality of cameras 110, a memory 120, a processor 130, and an input/output interface 140. Hereinafter, an embodiment is exemplified as the camera system 100 is a 360-degree camera including the plurality of cameras 110 (e.g., 6 cameras). Embodiments are not limited thereto. For example, the camera system 100 may be various camera systems (e.g., a stereo camera system) in which the plurality of cameras 110 are located to capture images, each of which has an overlapped portion.

The memory 120 may be a computer-readable storage medium and may include a non-volatile mass storage device such as a random access memory, a read only memory (ROM), and a disc drive. Furthermore, the memory 120 may store an operating system (OS), an image captured by each of the plurality of cameras 110, or at least one program code (e.g., a code for performing an image stitching method described below). Such software components may be loaded from a computer-readable storage medium independent of the memory 120. Such a computer-readable storage medium may include computer-readable storage media such as a floppy drive, a disk, a tape, a digital versatile disc/compact disc-ROM (DVD/CD-ROM) drive, and a memory card. In another embodiment, software components may be loaded into the memory 120 via a communication module (not shown) rather than a computer-readable storage medium.

The processor 130 may be configured to process instructions of a computer program by performing basic calculation and logic and a basic input/output arithmetic operation. The instructions may be provided to the processor 130 by the memory 120 or the communication module. For example, the processor 130 may be configured to execute instructions received according to a program code stored in a storage device such as the memory 120.

The input/output interface 140 may be a means for interfacing with an input/output device (not shown). For example, the input device may include devices such as a touch screen and a button included in the camera system 100, and the output device may include a device such as a display which displays captured images. For another example, the input/output interface 140 may be a means for interfacing with a device, such as a touch screen, in which functions for an input and an output integrate into one.

In another embodiment, the camera system 100 may include more components than the components of FIG. 1. However, there is no need for clearly illustrating most conventional components. For example, the camera system 100 may further include other components, for example, a transceiver, a global positioning system (GPS) module, various sensors, and a database.

Hereinafter, a description will be given of a detailed embodiment of an image stitching method executed by the processor 130 included in the above-mentioned camera system 100 and a detailed embodiment of an image stitching system including the processor 130.

Figure 2:
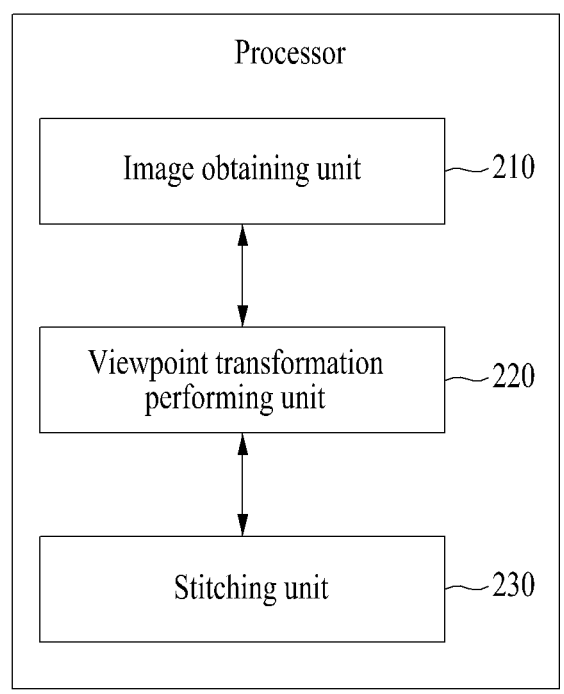
FIG. 2 is a block diagram illustrating an example of components capable of being included in a processor a camera system according to an embodiment.

FIG. 2 is a block diagram illustrating an example of components capable of being included in a processor a camera system according to an embodiment.

Referring to FIG. 2, an image stitching system according to an embodiment may be configured to include a processor 130 of a camera system 100 with reference to FIG. 1. In detail, as shown, the image stitching system may include an image obtaining unit 210, a viewpoint transformation performing unit 220, and a stitching unit 230 which are components of the processor 130. According to an embodiment, the components of the processor 130 may be selectively included or excluded from the processor 130. Furthermore, according to an embodiment, the components of the processor 130 may be separated or merged for a representation of a function of the processor 130. For example, at least some of the components of the processor 130 may be implemented as a processor included in a separate server communicatively connected with the camera system 100.

Figure 8:
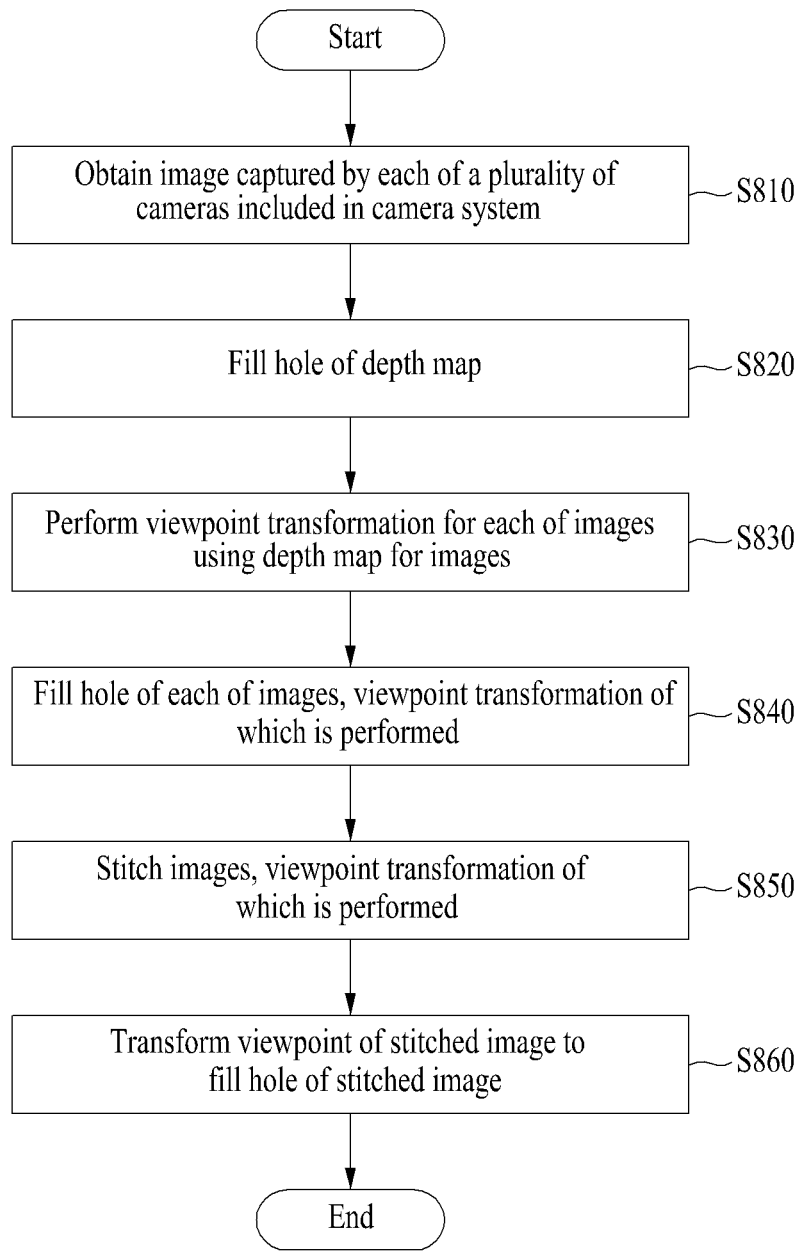
FIG. 8 is a flowchart illustrating an image stitching method according to an embodiment.

Such components of the processor 130 may be implemented to execute instructions of a code of an operating system (OS) 120 and instructions of at least one program (e.g., a program configured with a code executing an image stitching method), included in the memory to perform operations S810 to S860 included in the image stitching method of FIG. 8.

Herein, the components of the processor 130 may be representations of different functions according to instructions provided from a program code stored in the memory 120. For example, the image obtaining unit 210 may be used as a functional representation for an operation of obtaining an image captured by each of a plurality of cameras 110 included in the camera system 100.

Thus, the respective components of the processor 130 may perform the image stitching method by performing the following operations. In detail, the image obtaining unit 210 may obtain an image captured by each of the plurality of cameras 110 included in the camera system 100. The viewpoint transformation performing unit 220 may perform viewpoint transformation for each of images using a depth map for the images. The stitching unit 230 may stitch the images, the viewpoint transformation of which is performed. An image stitching system may transform a viewpoint of each of the images as if the images are captured in the same location and may stitch the images without a separate device while a camera does not rotate or move physically. A detailed description will be given of an operation of each of the components with reference to FIG. 8. A detailed description will be given of an operation principle of the viewpoint transformation performing unit 220 with reference to FIGS. 3 to 7.

FIGS. 3 to 7 are drawings illustrating an image stitching method according to an embodiment.

Figure 3:
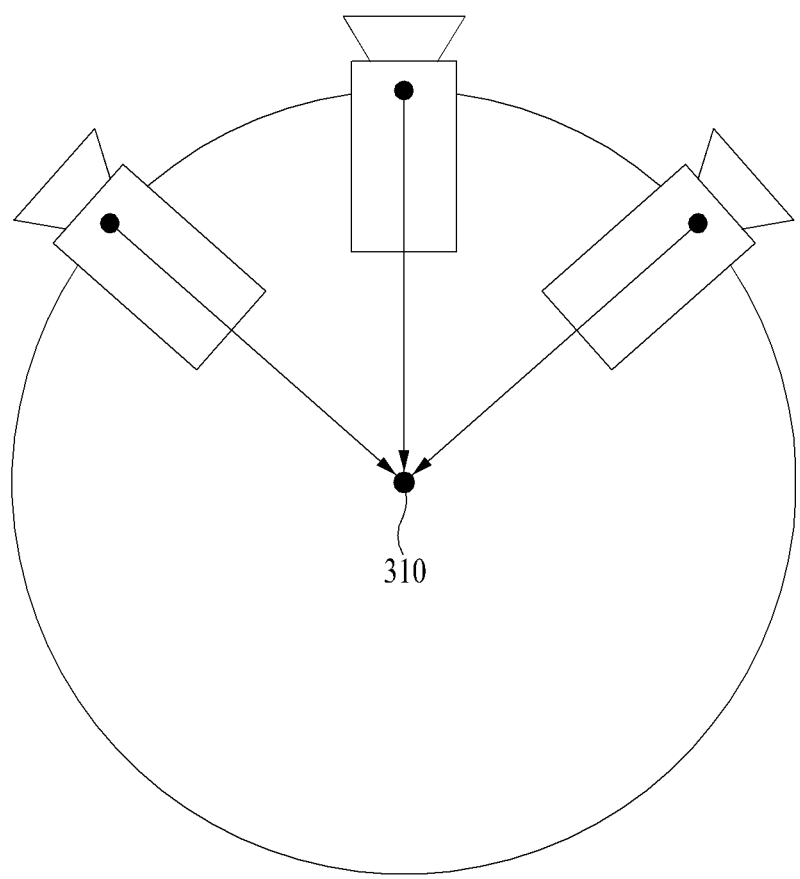
FIGS. 3, 4, 5, 6, and 7 are drawings illustrating an image stitching method according to an embodiment.

Referring to FIG. 3, an image stitching system according to an embodiment may transform an image captured by each of a plurality of cameras 110 as if the image is captured in the same location 310, by matching an optical center of each of the plurality of cameras 10 to the virtual specific location 310.

In this case, when the optical center of each of the plurality of cameras 110 is matched to the virtual specific location 310, viewpoints of the images captured by the plurality of cameras 110 may also coincide with each other.

In other words, the image stitching system may perform an image stitching method by transforming the viewpoints of the images captured by the plurality of cameras 110 like viewpoints of images captured at the virtual specific location 310, rather than actually moving each of the plurality of cameras 110.

Figure 4:
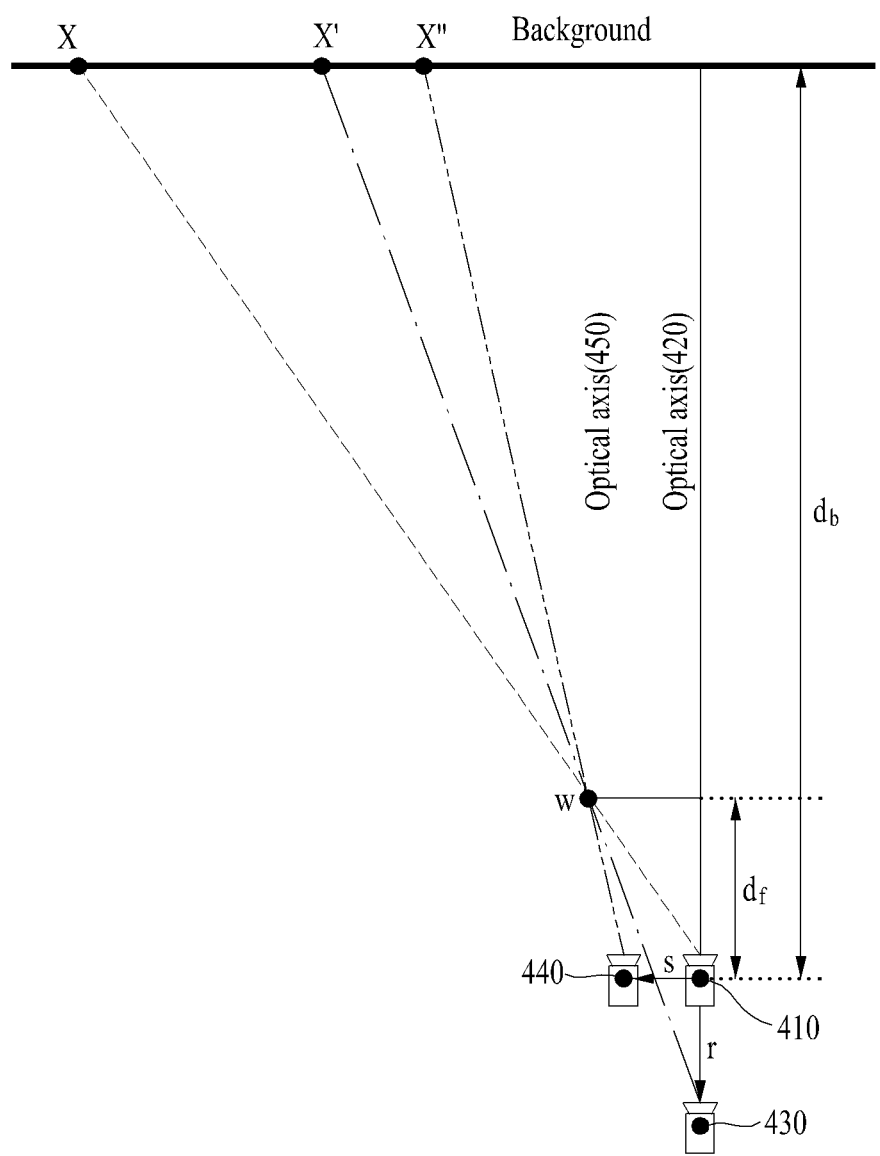

Referring to FIG. 4, point w spaced apart from a camera at a specific location 410 by distance $d_f$ may appear at a location away from a background at distance $d_b$ on an optical axis 420 by X. When the camera is arranged at a location 430 moved backward from the specific location 410 by r, this location may change to location X'. When the camera is arranged at a location 440 moved sideward from the specific location 410 by s, this location may change to a location away from the background on an optical axis 450 by X". When such locations X, X', and X" appear at locations away from the center of an image on the image by x, x', and x", the locations may be calculated using a pinhole camera model shown in FIGS. 5 to 7.

For example, when the camera moves to the location 430 moved backward from the specific location 410 by r, as shown in FIG. 4, X' may be calculated using Equation 1 below.

$$X' = w \cdot \frac{d_b + r}{d_f + r} \qquad \text{[Equation 1]}$$

Figure 5:
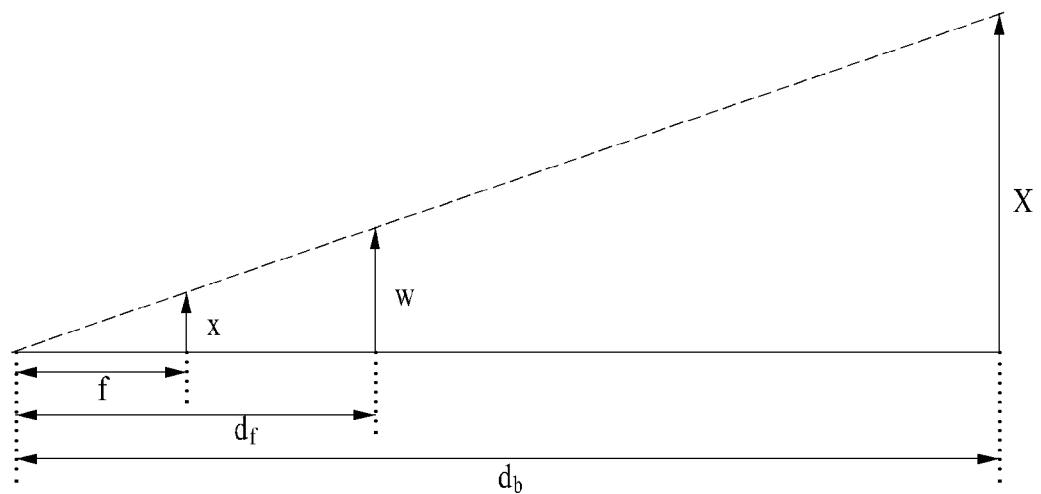
Figure 6:
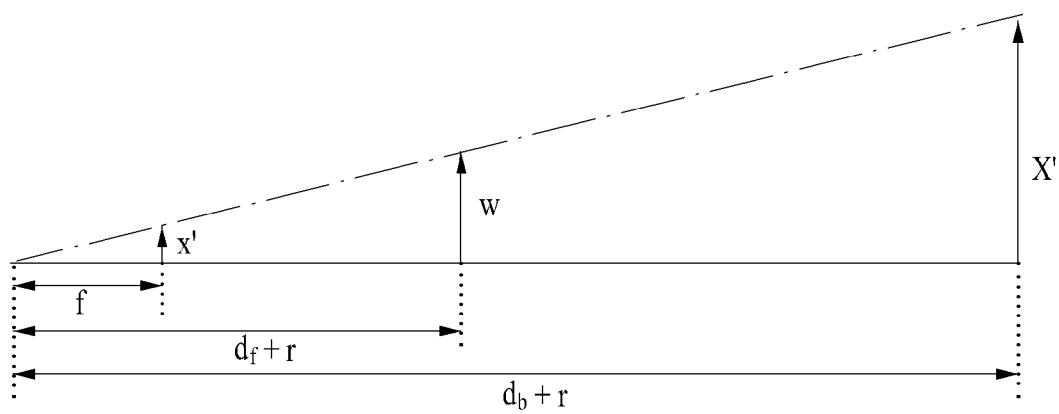

Furthermore, X' calculated using Equation 1 above may be represented as Equation 2 below in an image using a pinhole camera model shown in FIGS. 5 and 6.

$$x' = x \cdot \frac{d_f}{d_f + r} \quad \text{[Equation 2]}$$

Meanwhile, depth d and parallax D have a relationship of $$d = \frac{fB}{D}$$

in a depth map (here, f refers to a focal length, B refers to a length of a baseline between the plurality of cameras 110 in the camera system 100, and D refers to parallax), Equation 2 above may be represented as Equation 3 below.

$$x' = x \cdot \frac{fB}{fB + rD} \quad \text{[Equation 3]}$$

For another example, when the camera moves to the location 440 away sideward from the specific location 410 by s, as shown in FIG. 4, X" may be calculated using Equation 4 below.

$$X'' - s = X - s \cdot \frac{d_b}{d_f} \quad \text{[Equation 4]}$$

Figure 7:
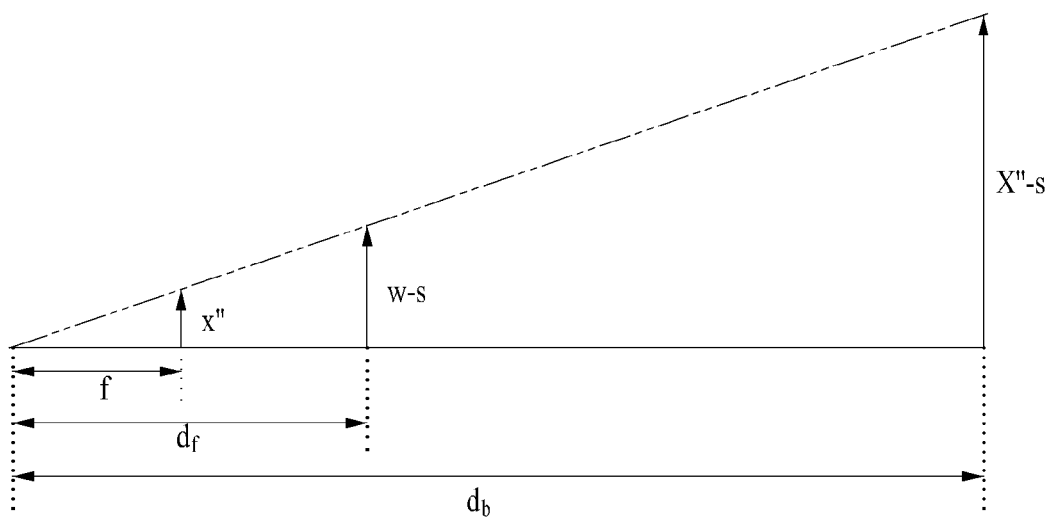

Furthermore, X" calculated using Equation 4 above may be represented as Equation 5 below in the image using a pinhole camera model shown in FIGS. 5 to 7 and may be represented as Equation 6 below depending on a relationship between depth d and parallax D.

$$x'' = x - s \cdot \frac{f}{d_f} \quad \text{[Equation 5]}$$

$$x'' = x - s \cdot \frac{D}{B} \quad \text{[Equation 6]}$$

Thus, when the camera moves to a location moved backward from the specific location 410 by r and moved away sideward from the specific location 410 by s, x" may be calculated using Equation 7 below in the image using the pinhole camera model shown in FIGS. 5 to 7.

$$x'' = \frac{xd_f - sf}{d_f + r} \quad \text{[Equation 7]}$$

Furthermore, Equation 7 above may be represented as Equation 8 below depending on a relationship between depth d and parallax D.

$$x'' = \frac{xfB - fsD}{fB + rD} \quad \text{[Equation 8]}$$

A viewpoint transformation formula of transforming an image captured at the specific location 410 by the camera into an image captured when the camera moves from the specific location 410 in x, y, and z directions by $m_x$, $m_y$, and $m_z$ may be obtained from Equation 8 above. When x, y, x', and y' are pixel locations in each image with respect to an original image I(x, y) captured at the specific location 410 by the camera and a transformed image I'(x', y') which is an image captured when the camera moves from the specific location 410 by $m_x$, $m_y$, and $m_z$, forward warping may be represented as Equation 9 below. Backward warping may be represented as Equation 10 below.

$$I(x', y') = I\left(x \cdot \frac{xfB - fm_xD}{fB + m_zD} - c_x, y \cdot \frac{yfB - fm_yD}{fB + m_zD} - c_y\right) \quad \text{[Equation 9]}$$

$$I(x, y) = I\left(\frac{x'(fB + m_zD) + fm_xD}{fB} - c_x \cdot \frac{y'(fB + m_yD) + fm_zD}{fB} - c_y\right) \quad \text{[Equation 10]}$$

In Equations 9 and 10, $c_x$ and $c_y$ may refer to coordinates of the image center passing through the optical axes 420 and 450.

The image stitching system according to an embodiment may stitch images by performing viewpoint transformation for the images using the derived Equations 9 and 10. A detailed description thereof will be given with reference to FIG. 8. A detailed description of a system and method for performing viewpoint transformation of an image will be given with reference to FIGS. 9 and 10.

FIG. 8 is a flowchart illustrating an image stitching method according to an embodiment.

Referring to FIG. 8, in operation S810, an image obtaining unit 210 included in an image stitching system according to an embodiment may obtain an image captured by each of a plurality of cameras 110 included in a camera system 100 of FIG. 1. In this case, the plurality of cameras 110 may be physically separated (spaced apart from) from each other to have a portion where the images captured by the plurality of cameras 110 are overlaid with each other, so parallax may occur between images (the images captured by the plurality of cameras 110).

Furthermore, in operation S810, the image obtaining unit 210 may further obtain a depth map for the images concurrently with obtaining the images. Hereinafter, the depth map for the images may be obtained as an image defining a relationship between parallax and depth throughout all pixels of the image through an existing algorithm of obtaining the depth map at the same time the images are captured.

In this case, when the plurality of cameras 110 are two left and right cameras and when a left-to-right depth map and a right-to-left depth map are obtained using an image captured by the left camera and an image captured by the right camera, a hole may occur in a region where the image captured by the left camera and the image captured by the right camera are not registered.

Thus, in operation S820, the image stitching system may fill the hole of the depth map before operation S830. For example, the image stitching system may fill a value of a pixel corresponding to the hole with a pixel value of a region adjacent to the region where the hole occurs in the depth map. An embodiment is exemplified as such operation S820 is performed by the image stitching system, but, more accurately, is performed by any one of an image obtaining unit 210, a viewpoint transformation performing unit 220, or a stitching unit 230 included in the image stitching system. However, embodiments are not limited thereto. For example, such operation S820 may be performed by a component (not shown) independent of the image obtaining unit 210, the viewpoint transformation performing unit 220, and the stitching unit 230 among the components included in the image stitching system.

In operation S830, the viewpoint transformation performing unit 220 included in the image stitching system may perform viewpoint transformation for each of the images using a depth map for the images. In detail, the viewpoint transformation performing unit 220 may set a viewpoint transformation formula (e.g., Equation 9 or 10 described above) based on a focal length of each of the plurality of cameras 110, a length of a baseline of the camera system 100, and parallax between the plurality of cameras 110, based on the depth map and may determine a movement parameter in the viewpoint transformation formula, thus transforming viewpoints of the images using the viewpoint transformation formula to be matched.

Herein, the movement parameter may be a value associated with a distance to move when a location where each of the images is captured moves to a virtual specific location and may correspond to $m_x$, $m_y$, and $m_z$ in Equations 9 and 10 above. Thus, for the viewpoint transformation performing unit 220 to determine the movement parameter may refer to determining a distance to move, when an optical center of each of the plurality of cameras 110 moves to a virtual reference location of the camera system 100, as the movement parameter. In this case, as shown in FIG. 3, when the camera system 100 is a 360-degree camera system, the virtual reference location may refer to a center point 310 of a circle on which the plurality of cameras 110 are arranged. When the camera system 100 is a stereo camera system in which two cameras are horizontally located, the virtual reference location may refer to a point moved backward from a middle point of the two cameras by a constant distance or more. For example, as shown in FIG. 3, when the camera system 100 is the 360-degree camera system, the viewpoint transformation performing unit 220 may determine only a value of $m_z$ in Equation 9 or 10 above. When the camera system 100 is the stereo camera system in which the two cameras are horizontally located, the viewpoint transformation performing unit 220 may determine $m_x$ or $m_y$ as half the size of a baseline of the stereo camera system.

As such, to determine the distance to move, when the optical center of each of the plurality of cameras 110 moves to the virtual reference location of the camera system 100, as the movement parameter, it may be essential to perform an operation of checking the optical center of each of the plurality of cameras 110. Although not illustrated, such an operation may be adaptively performed at any time before operation S830. Such an operation may be performed by experimentally searching for a location of a rotary axis of each of the plurality of cameras 110, where parallax does not occur when the rotary axis moves forward and backward and rotates left and right.

In other words, in operation S830, the viewpoint transformation performing unit 220 may match the viewpoints of the images by transforming the viewpoint of each of the images into a viewpoint of an image captured at a reference location of the camera system 100. As shown in FIG. 3, when the camera system 100 is the 360-degree camera system, the viewpoint transformation performing unit 220 may perform virtual transformation in which each of the plurality of cameras 110 moves to the point 310 moved backward. When the camera system 100 is the stereo camera system in which two cameras are horizontally located, the viewpoint transformation performing unit 220 may perform virtual transformation in which each of the plurality of cameras 110 moves to a point moved backward from a middle point of the plurality of cameras 110 over a constant distance.

After the viewpoint transformation for each of the images is performed, in operation S840, the image stitching system may fill a hole of each of the images, the viewpoint transformation of which is performed. For example, the image stitching system may fill a value of a pixel corresponding to the hole with a pixel value of a region adjacent to a region where the hole occurs in each of the images, the viewpoint transformation of which is performed. For another example, when regions, each of which has a hole, differ from each other in the images, the viewpoint transformation of which is performed, the image stitching system may fill a value of a pixel corresponding to the hole in a first image, the viewpoint transformation of which is performed, with a pixel value of a region corresponding to the hole of the first image in a second image, the viewpoint transformation of which is performed. Likewise, the image stitching system may fill a value of a pixel corresponding to the hole in the second image, the viewpoint transformation of which is performed, with a pixel value of a region corresponding to the hole of the second image in the first image, the viewpoint transformation of which is performed. An embodiment is exemplified as such operation S840 is performed by the image stitching system, but, more accurately, is performed by any one of the image obtaining unit 210, the viewpoint transformation performing unit 220, or the stitching unit 230. However, embodiments are not limited thereto. For example, operation S840 may be performed by a component (not shown) independent of the image obtaining unit 210, the viewpoint transformation performing unit 220, and the stitching unit 230 among the components included in the image stitching system.

In operation S850, the stitching unit 230 included in the image stitching system may stitch the images, the viewpoint transformation of which is performed. For example, the stitching unit 230 may project the images, the viewpoint transformation of which is performed, onto a cylinder or sphere to synthesize the images as a panorama. A conventional compositing scheme may be used as a stitching scheme, so a detailed description therefor will be omitted since it departs from the scope and spirit of the inventive concept.

In operation S860, the viewpoint transformation performing unit 220 may transform a viewpoint of the stitched image to fill a hole of the stitched image. To transform the viewpoint of the stitched image may be performed in a direction opposite to operation S830 in the same principle as operation S830. For example, when transformation moved from a viewpoint of each of the images to a viewpoint of an image captured at the point 310 moved backward is performed in operation S830, in operation S860, the viewpoint transformation performing unit 220 may perform transformation moved from the point 310 moved backward to a point moved forward. Thus, most of a hole which occurs while the viewpoint of each of the images is moved backward may be filled.

As such, according to the above-mentioned embodiments, an image stitching method for performing viewpoint transformation for each of the images using a viewpoint transformation formula based on a depth map, matching viewpoints of the images (matching optical centers of the plurality of cameras 110) to remove parallax between the images, and stitching the images, a system therefor, and a computer program may be proposed, so the system may transform a viewpoint of each of the images as if the images are captured at the same location and may stitch the images, without a separate device while a camera does not rotate or move physically. Thus, completion of the stitched image may be enhanced. Although there is parallax between the images, the images may be stitched seamlessly and naturally.

Furthermore, operation S830 may be used by being implemented as a separate method and system. A detailed description therefor will be given with reference to FIGS. 9 and 10.

Figure 9:
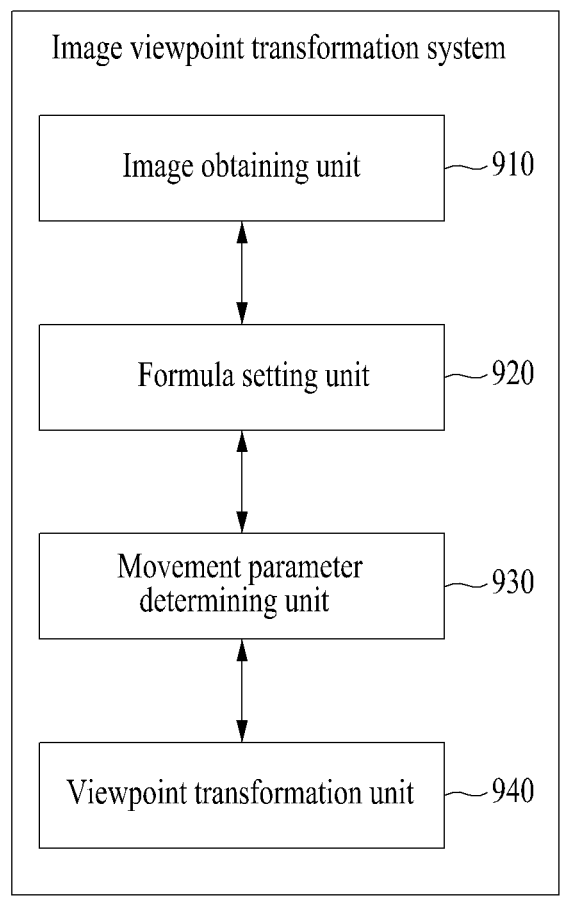
FIG. 9 is a block diagram illustrating an image viewpoint transformation system according to an embodiment.

FIG. 9 is a block diagram illustrating an image viewpoint transformation system according to an embodiment. FIG. 10 is a flowchart illustrating an image viewpoint transformation system according to an embodiment.

Referring to FIGS. 9 and 10, an image viewpoint transformation system 900 according to an embodiment may be configured as a processor included in a camera system including at least one camera. As shown, the image viewpoint transformation system 900 may include an image obtaining unit 910, a formula setting unit 920, a movement parameter determining unit 930, and a viewpoint transformation unit 940, which are components of the processor. According to an embodiment, the components of the processor may be selectively included or excluded from the processor. Furthermore, according to an embodiment, the components of the processor may be separated or merged for a representation of a function of the processor. For example, at least some of the components of the processor may be implemented in a processor included in a separate server communicatively connected with the camera system.

Such components of the processor may be implemented to execute instructions of a code of an operating system (OS) and instructions of at least one program (e.g., a program configured with a code executing an image viewpoint transformation method), included in a memory to perform operations S1010 to S1040 included in the image viewpoint transformation method.

Herein, the components of the processor may be representations of different functions according to instructions provided from a program code stored in the memory. For example, the image obtaining unit 910 may be used as a functional representation for an operation of obtaining an image captured by the camera system.

Thus, the respective components of the processor may perform the image viewpoint transformation method by performing the following operations.

In operation S1010, the image obtaining unit 910 may obtain an image captured by the camera system (including at least one camera).

Furthermore, in operation S1010, the image obtaining unit 910 may further obtain a depth map for the image concurrently with obtaining the image. Hereinafter, the depth map for the image may be obtained as an image defining a relationship between parallax and depth throughout all pixels of the image through an existing algorithm of obtaining the depth map at the same time the image is captured. Moreover, the depth map may be obtained by simultaneously capturing a plurality of images using a plurality of cameras or sequentially capturing the plurality of images using one camera.

In operation S1020, the formula setting unit 920 may set a viewpoint transformation formula (e.g., Equation 9 or 10 described above) based on a focal length of the camera system, a length of a baseline of the camera system, and parallax of the camera system, based on the depth map for the image.

In operation 1030, the movement parameter determining unit 930 may determine a movement parameter in the viewpoint transformation formula.

Herein, the movement parameter may be a value associated with a distance to move when a location where the image is captured moves to a virtual specific location and may correspond to $m_x$, $m_y$, and $m_z$ in Equations 9 and 10 above. Thus, for the movement parameter determining unit 930 to determine the movement parameter may refer to determining a distance to move, when an optical center of the camera system (or an optical center of at least one camera included in the camera system) moves to the virtual specific location, as the movement parameter.

As such, to determine the distance to move when the optical center of the camera system moves to the virtual specific location as the movement parameter, it may be essential to perform an operation of checking the optical center of the camera system. Although not illustrated, such an operation may be adaptively performed at any time (e.g., operation 1020) before operation S1030. Such an operation may be performed by experimentally searching for a location of a rotary axis of the camera system, parallax of which does not occur, when the rotary axis of the camera system moves forward and backward and rotates left and right.

In operation S1040, the viewpoint transformation unit 940 may transform a viewpoint of the image using the viewpoint transformation formula. In other words, in operation S1040, the viewpoint transformation unit 940 may match the images by transforming the viewpoint of the image into a viewpoint of an image captured at the virtual specific location.

The above-mentioned image viewpoint transformation method may further include operations S820 and/or S840 described above with reference to FIG. 8 other than the above-mentioned operations S1010 to S1040. In this case, the image viewpoint transformation system may perform an operation of filling a hole of the depth map before operation S1020 and may perform an operation of filling a hole of the image, the viewpoint transformation of which is performed.

As such, according to an embodiment, the image viewpoint transformation method for transforming the viewpoint of the image using the viewpoint transformation formula based on the depth map for the image, the system therefor, and the computer program may be proposed, so the system may provide technology of transforming a viewpoint as if the image is captured at a virtual specific location without changing a physical location of a camera. Thus, the image, the viewpoint transformation of which is performed, may be widely used.

The foregoing devices may be realized by hardware components, software components, and/or combinations thereof. For example, the devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented with program instructions which may be executed through various computer means and may be recorded in computer-readable media. The media may also include, alone or in combination with the program instructions, data files, data structures, and the like. The program instructions recorded in the media may be designed and configured specially for an embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of embodiments, or vice versa.

According to an embodiment, the image stitching method, the system therefor, and the computer program stored in a computer-readable storage medium to be combined with a computer and execute the image stitching method may transform a viewpoint of each of images as if the images are captured at the same location and may stitch the images without a separate device while a camera does not rotate or move physically.

In detail, according to an embodiment, the image stitching method, the system therefor, and the computer program may match optical centers which are viewpoints of images to remove parallax between the images and may stitch the images by performing viewpoint transformation for each of the images using a viewpoint transformation formula based on a depth map for the images.

According to an embodiment, the image stitching method, the system therefor, and the computer program may enhance completion of a stitched image by filling a hole in images, viewpoint transformation of which is performed, and the stitched image.

According to an embodiment, technology may stitch images seamlessly and naturally although there is parallax between the images.

According to an embodiment, the image viewpoint transformation method, the system therefor, and the computer program stored in a computer-readable storage medium to be combined with a computer and execute the image viewpoint transformation method may transform a viewpoint of an image using a viewpoint transformation formula based on a depth map for the image.

According to an embodiment, technology may transform a viewpoint of an image as if the image is captured at a virtual specific location without changing a physical location of a camera, thus widening utilization of an image, viewpoint transformation of which is performed.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image stitching method using viewpoint transformation executed by a computer included in a camera system, the method comprising:
   obtaining images captured by a plurality of cameras included in the camera system;
   performing viewpoint transformation for each of the images using a depth map for the images; and
   stitching the images, the viewpoint transformation of which is performed,
   wherein the performing of the viewpoint transformation for each of the images comprises:
   setting a viewpoint transformation formula including a backward warping equation;
   determining a movement parameter in the viewpoint transformation formula, the movement parameter being a value associated with a distance to move when a location where each of the images is captured moves to a virtual specific location; and
   transforming viewpoints of the images using the viewpoint transformation formula to be matched,
   wherein the backward warping equation is:

$$I(x, y) = I'\left(\frac{x'(fB + m_z D) + fm_x D}{fB} - c_x, \frac{y'(fB + m_y D) + fm_z D}{fB} - c_y\right)$$

and in the backward warping equation, I(x, y) denotes the images captured by a plurality of cameras included in the camera system, x, y denote the pixel locations in each the images captured by the plurality of cameras included in the camera system, I'(x', y') denotes transformed images resulting from the viewpoint transformation which is performed, x', y' refer to the pixel locations in each the transformed images resulting from the viewpoint transformation which is performed, f denotes to a focal length of each of the plurality of cameras, B denotes to a length of a baseline of the camera system, D denotes to a parallax between the plurality of cameras, $m_x$, $m_y$, $m_z$ denote the movement parameter, and $c_x$, $c_y$ denote coordinates of an image center passing through an optical axes.

2. The method of claim 1, wherein the determining of the movement parameter in the viewpoint transformation formula comprises:

determining the movement parameter based on a distance to move when an optical center of each of the plurality of cameras moves to a virtual reference location of the camera system.

3. The method of claim 2, wherein the determining of the movement parameter in the viewpoint transformation formula comprises:

determining the movement parameter based on the length of the baseline of the camera system.

4. The method of claim 1, wherein the transforming of the images to be matched comprises:

transforming the viewpoint of each of the images into a viewpoint of an image captured at a reference location of the camera system.

5. The method of claim 1, wherein the performing of the viewpoint transformation for each of the images further comprises:

filling a hole of the depth map before performing the viewpoint transformation for each of the images.

6. The method of claim 1, wherein the performing of the viewpoint transformation for each of the images further comprises:

filling a hole of each of the images, the viewpoint transformation of which is performed.

7. The method of claim 1, wherein the stitching of the images, the viewpoint transformation of which is performed, further comprises:

transforming a viewpoint of the stitched image to fill a hole of the stitched image.

* * * * *